(12) United States Patent
Gonzalez et al.

(10) Patent No.: US 9,427,855 B2
(45) Date of Patent: Aug. 30, 2016

(54) CRIMPING TOOL FOR A BOOT CLAMP

(71) Applicant: GKN Driveline North America, Inc., Auburn Hills, MI (US)

(72) Inventors: Gabriel Gonzalez, Celaya (MX); Marco Moreno, Celaya (MX); Karl R. Tech, Grosse Pointe, MI (US)

(73) Assignee: GKN DRIVELINE NORTH AMERICA, INC., Auburn Hills, MI (US)

( * ) Notice: Subject to any disclaimer, the term of this patent is extended or adjusted under 35 U.S.C. 154(b) by 0 days.

(21) Appl. No.: 14/701,634

(22) Filed: May 1, 2015

(65) Prior Publication Data

US 2015/0314428 A1    Nov. 5, 2015

Related U.S. Application Data

(60) Provisional application No. 61/987,105, filed on May 1, 2014, provisional application No. 61/989,469, filed on May 6, 2014.

(51) Int. Cl.
| | |
|---|---|
| *B21D 39/04* | (2006.01) |
| *B25B 27/02* | (2006.01) |
| *B25B 27/14* | (2006.01) |
| *F16L 33/23* | (2006.01) |
| *F16L 23/06* | (2006.01) |
| *F16L 33/04* | (2006.01) |

(52) U.S. Cl.
CPC .......... *B25B 27/023* (2013.01); *B25B 27/146* (2013.01); *F16L 23/06* (2013.01); *F16L 33/04* (2013.01); *F16L 33/23* (2013.01)

(58) Field of Classification Search
CPC ....... B21D 39/04; B21D 41/00; F16L 33/23; F16L 23/06; F16L 33/04; B25B 27/146

USPC .......................................................... 72/407
See application file for complete search history.

(56) References Cited

U.S. PATENT DOCUMENTS

| | | | | |
|---|---|---|---|---|
| 473,537 | A * | 4/1892 | Weidaw .................. | F16L 33/04 24/284 |
| 3,172,384 | A * | 3/1965 | Tipton .................... | F16L 23/06 269/228 |
| 3,555,875 | A * | 1/1971 | Clark ..................... | B21D 41/00 72/292 |
| 4,758,029 | A * | 7/1988 | Davis ..................... | F16L 33/23 285/253 |
| 4,782,577 | A * | 11/1988 | Bahler ................... | B25B 1/205 24/278 |
| 5,306,051 | A * | 4/1994 | Loker ..................... | F16L 33/23 285/222.1 |
| 5,619,883 | A * | 4/1997 | Dischler ................ | B21D 39/04 29/237 |
| 5,901,798 | A * | 5/1999 | Herrera ................. | E21B 17/105 166/241.3 |
| 6,044,686 | A * | 4/2000 | Dischler ................ | B21D 39/04 29/237 |
| 6,511,380 | B1 | 1/2003 | Oetiker | |
| 6,634,202 | B1 | 10/2003 | Oetiker | |

* cited by examiner

*Primary Examiner* — David B Jones
(74) *Attorney, Agent, or Firm* — Jennifer M. Brumbaugh; Reising Ethington P.C.

(57) ABSTRACT

A tool for compressing an annular clamp such as may be used on a boot for a constant velocity joint. The tool includes multiple segments each having an interior adapted to engage an exterior surface of the clamp, and at least two segments are movable relative to each other to permit variation of the size of a gap provided between the two segments. A drive is associated with the two segments to move the two segments and vary the size of the gap between the two segments. The segments are interconnected and adapted to surround at least a majority of the exterior surface of the clamp and movement of the two segments by the drive varies an inner diameter defined by the segments to crimp or compress the clamp. In at least some implementations, this may be done with the CVJ installed on a vehicle.

20 Claims, 5 Drawing Sheets

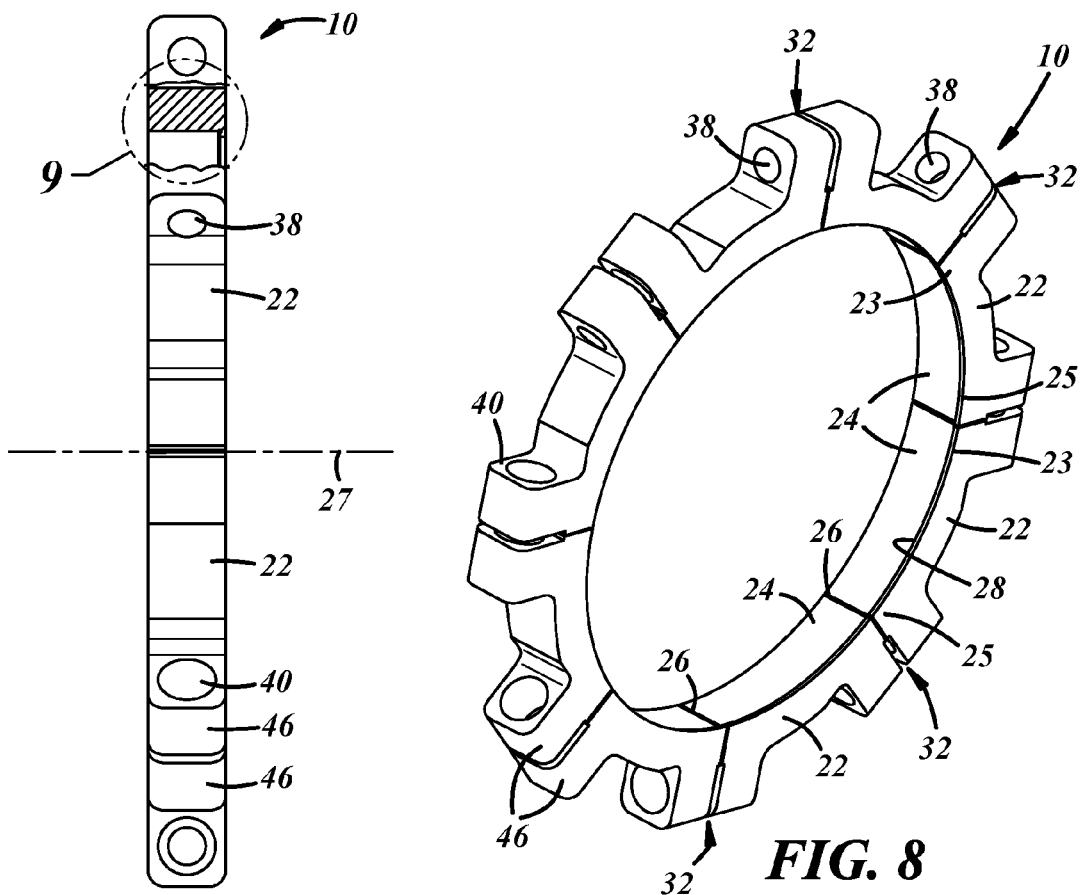
FIG. 7
FIG. 8
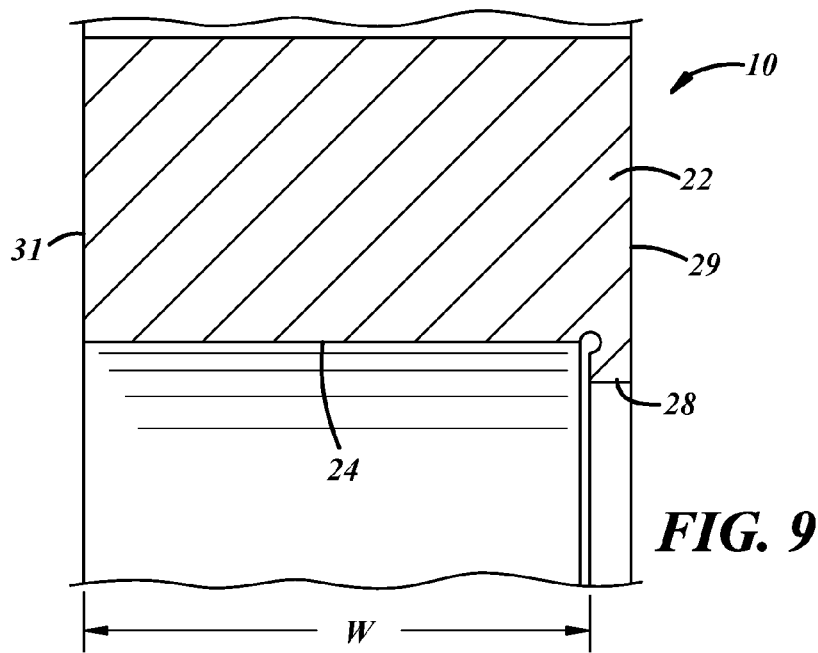
FIG. 9

CRIMPING TOOL FOR A BOOT CLAMP

REFERENCE TO CO-PENDING APPLICATIONS

This application claims the benefit of U.S. Provisional Patent Application Ser. Nos. 61/987,105 filed May 1, 2014 and 61/989,469 filed May 6, 2014, which are incorporated herein by reference in their entirety.

TECHNICAL FIELD

The present disclosure relates generally to a clamp such as may be used to retain a constant velocity boot, and more particularly to a crimping tool for a boot clamp.

BACKGROUND

A constant velocity joint (CVJ) may include a flexible boot that retains lubrication within the joint and also inhibits intrusion of contaminants into the joint. One end of the boot may be secured and sealed to a shaft extending from the CVJ, and the other end of the boot may be secured to part of the CVJ itself, such as about the perimeter of an outer race of the CVJ. To retain the ends of the boot to the shaft and CVJ, clamps may be used, with the clamps surrounding and trapping part of the boot against the adjacent component. It can be difficult to provide an installed clamp that uniformly and adequately secures the boot about the entire circumference of the boot and clamp interface. Hence, boot failures may occur in which the boot undesirably moves relative to the components to which it is secured, or lubrication escapes from the joint or contamination of the joint is permitted.

SUMMARY

A tool for compressing an annular clamp such as may be used on a boot for a constant velocity joint. The tool includes multiple segments each having an interior adapted to engage an exterior surface of the clamp, and at least two segments are movable relative to each other to permit variation of the size of a gap provided between the two segments. A drive is associated with the two segments to move the two segments and vary the size of the gap between the two segments. The segments are interconnected and adapted to surround at least a majority of the exterior surface of the clamp and movement of the two segments by the drive varies an inner diameter defined by the segments to crimp or compress the clamp. In at least some implementations, this may be done with the CVJ installed on a vehicle.

In at least some embodiments, a tool for compressing or crimping a clamp for a boot on a constant velocity joint includes multiple segments each having an interior adapted to engage an exterior surface of the clamp. Each segment may have two ends with each end adapted to be connected to and movable relative to at least one adjacent segment. A junction is defined at each end of each segment and an adjustable gap is provided at each junction. A separate drive is associated with each junction, each drive being movable to move the ends of the segments associated with that drive and thereby vary the size of the gap at the associated junction. The segments may be interconnected and adapted to surround at least a majority of the exterior surface of the clamp so that movement of the drives varies an inner diameter defined by the segments. In this way, the clamp may be compressed or crimped.

BRIEF DESCRIPTION OF THE DRAWINGS

The following detailed description of preferred embodiments and best mode will be set forth with reference to the accompanying drawings, in which:

FIG. 7 is a partially sectioned side view of the tool in FIG. 6;

FIG. 8 is a perspective view of the tool;

FIG. 9 is an enlarged view of the encircled portion 9 in FIG. 7;

DETAILED DESCRIPTION OF PREFERRED EMBODIMENTS

Figure 1:
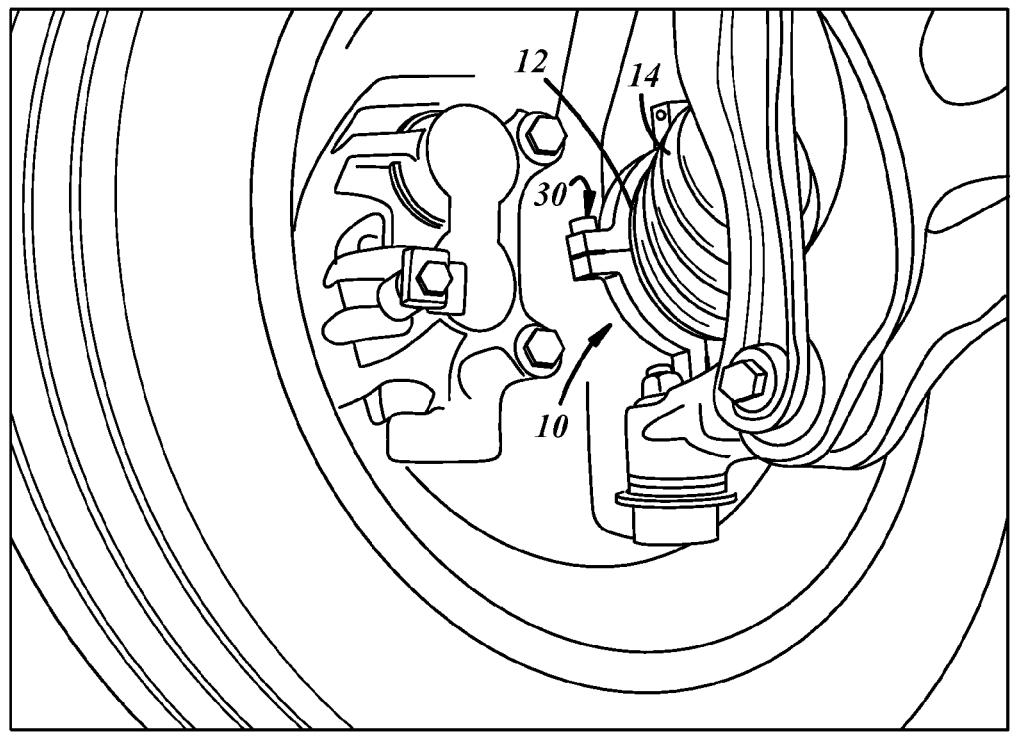
FIG. 1 is a fragmentary perspective view showing a vehicle wheel and related components including a constant velocity joint with a boot and a crimping tool positioned over a clamp for the boot.

Referring in more detail to the drawings, FIGS. 1-5 illustrate a crimping tool 10 for compression and/or crimping of a ring or clamp 12. The clamp 12 may be used to secure a constant velocity joint (CVJ) boot 14 relative to a shaft (e.g. a halfshaft) or the CVJ (e.g. an outer race). The function and position of CVJs and halfshafts are known and will not be described further herein. The clamp 12 may be annular, formed of metal and positioned around an end of the boot 14 to trap the boot end against an adjacent component 16 (e.g. the outer race of the CVJ, see FIG. 4). To securely retain the boot 14, the clamp 12 may be crimped or compressed onto the boot providing a compressive force on the boot.

In at least some implementations, the clamp 12 has a circular outer surface 18 that is not interrupted by tabs, ears or other structures and may be formed without steps or deviations. The clamp 12 may also have a circular inner surface 20 (FIG. 4) that likewise is not interrupted by tabs, ears or other structures and may be formed without steps or deviations. While not limited to any particular style or design of clamp 12, one suitable clamp is available from Oetiker, Inc., and is called a Multi Crimp Ring, at least some of which are in Oetiker's product group 150. This style of clamp 12 has what is called a "puzzle piece" (not shown) extending from one end of the flat strip of metal from which the clamp is formed. The puzzle piece is received in a complementary void formed in the other end of the metal strip to interlock the ends of the strip which is formed into a complete annulus providing a generally right cylindrical clamp 12. To secure this clamp 12, it is crimped onto the boot 14 which reduces the inner diameter of the clamp 12. Of course, other configurations and other types of clamps may be used, the above is merely one example.

As shown in FIGS. 1-5, the tool 10 may be defined by multiple pieces or segments 22 and as shown in FIGS. 6-9, a similar tool 10' also may be defined by multiple segments 22. The tools 10, 10' may be of substantially identical construction and operation except that the tool 10' has more segments 22 than the tool 10. Accordingly, for ease of description, the same reference numerals for common features are applied to both tools 10, 10' in the various drawings. Likewise, certain views are provided for only one of the tools 10 or 10' but are applicable to the other tool as would be appreciated by a person of ordinary skill in the art.

As shown in the various drawings, each segment 22 may have an inner surface 24 adapted to overlie at least part of the outer surface 18 of the clamp 12. And each segment 22 may be coupled at each end 23, 25 (or another portion) to an adjacent segment 22 so that the interconnected segments define an annulus adapted to surround at least a majority of the clamp 12. In at least some implementations, the tool 10 substantially completely surrounds the clamp 12 where at least 330 degrees of the periphery of the clamp 12 is overlapped or surrounded by the tool. In some implementations, except for small gaps 26 that may exist between adjacent segments 22, the clamp 12 is completely overlapped by the tool 10.

The tool segments 22 may have a generally arcuate and circumferentially extending (relative to an axis 27 of the tool) inner surface 24 such that the segments collectively define a generally circular inner surface of the tool 10. The inner surface 24 of each segment 22 may have an axial width (w—labeled in FIG. 8) extending generally between opposed axial faces 29, 31 and of a size desired for use with a particular clamp 12 or type of clamp. That is, the axial width (w) of the inner surfaces 24 may be less than, greater than or equal to the axial width of the clamp 12. To facilitate aligning and locating the segments 22, and the tool 10 generally, relative to a clamp 12, one or more segments 22 may include a radially inwardly extending lip 28 adjacent to one axial face 29 and adapted to engage an axial face of the clamp 12 or boot 14. The lip 28, in at least some implementations, does not engage the outer surface 18 of the clamp 12, whereas the adjacent inner surface 24 of each segment 22 does engage the outer surface 18 of the clamp 12. The segments 22 may be formed of any suitable material to withstand the forces applied to the segments when the tool 10 is tightened, as will be described later, with metal, such as steel, being suitable in at least some applications.

At least two segments 22 may be coupled together by a drive which may be defined by one or more drive members 30. The drive member 30 may be moved between a retracted or first position wherein the clamp segments 22 define a first inner diameter of the tool 10 (defined collectively by the inner surfaces 24 of the segments 22) and an advanced or second position wherein the clamp segments 22 define a second inner diameter of the tool 10 that is smaller than the first inner diameter. The first and second inner diameters may be substantially circular, but need not be perfectly circular, and the second inner diameter may be more circular than the first inner diameter. Further, one or more gaps 26 may be provided at a junction 32 or points of connection between at least some of the segments 22, and the size of one or more gaps 26 may be smaller when a drive member 30 is moved to its second position than when the drive member 30 is in its first position. This reduces the inner diameter of the tool 10. When the tool is positioned around the outer surface 18 of the clamp 12, moving the drive member(s) 30 from the first position to the second position compresses and/or crimps the clamp 12.

Figure 10:
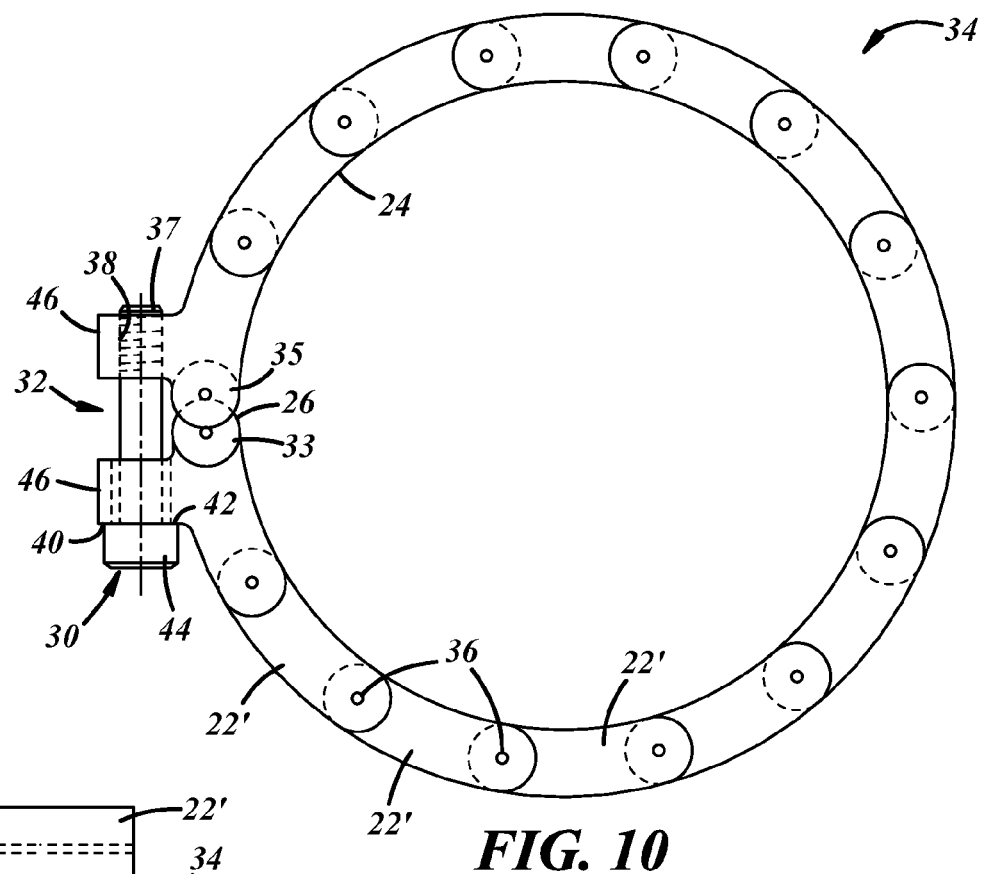
FIG. 10 is a front view of an alternate tool.
Figure 11:
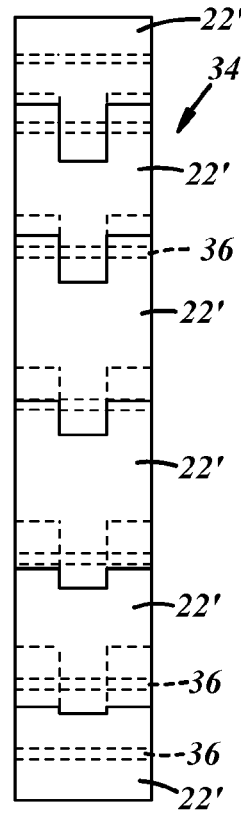
FIG. 11 is a side view of the tool of FIG. 10.
Figure 12:
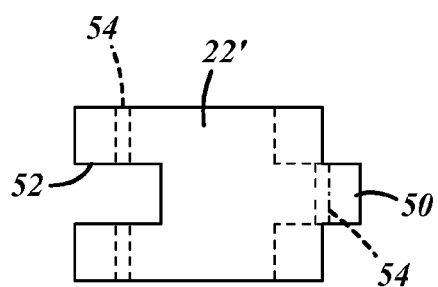
FIG. 12 is a side view of one segment of the tool of FIG. 10.

In at least some implementations, two or more segments 22 are serially connected together so that each segment 22 is connected to an adjacent segment at each end 23, 25 with an end 23 of one segment 22 connected to an end 25 of an adjacent segment 22, providing a junction 32 at each end of each segment 22. Thus, as shown in FIGS. 6-9, when eight segments 22 are provided in the tool 10, there are eight junctions 32 or points of connection between the segments, where the segments 22 are serially connected end-to-end with a pair of adjacent segments 22. And when there are four segments provided in a tool 10', as shown in FIGS. 1-5, there are four junctions 32 among all segments. Of course, there could be more or fewer segments 22 provided, as desired. In other forms, some of the segments may be coupled together without an adjustable gap 26 between them. As shown in FIGS. 10-12, many of the segments 22' in a tool 34 are pivotably coupled together by a pin 36 or other connector at adjacent ends such that the segments 22' may pivot relative to each other like links in a chain. In the version shown, each segment 22' has a projection 50 at one end and a complementary recess 52 at its other end. The projection 50 of one segment 22' is received in the recess 52 of an adjacent segment 22' and so on to form a chain of desired length. The pins 36 are received in bores 54 in the projection 50 and recess 52 that are aligned when the segments are arranged to be connected together. Two of the segments include a gap 26 between the ends 33, 35 at a junction 32 of the segments 22' that is adjustable as will be described later. The tool 34 may be defined by one or more than one chain, where more than one chain would result in more than one junction for the clamp.

In at least some implementations, a drive member 30 is provided at each junction 32 and movement of the drive member 30 between its first and second positions adjusts the size of the gap 26 defined between the segments 22 at the junction 32. The drive members 30 may be independently movable, that is, each drive member 30 may be separately moved without movement of the other drive members. Of course, two or more drive members 30 may be linked such that they are moved together, if desired. In the implementations shown, the drive members 30 include a threaded portion 37 that is received in a threaded bore 38 provided in one end 25 of one or more of the segments 22. In some forms, one segment 22 of a junction 32 may include a stop surface 40 or shoulder (e.g. at end 23) adapted to be engaged with a corresponding stop surface 42 (e.g. defined by an enlarged head 44) of the connector, and the other segment 22 in the junction 32 may include the threaded bore 38 in which the threaded portion 37 of the drive member is received. As the segments 22 are alternately and consecutively connected together, each segment 22 may include a threaded bore 37 at one end 25 and a stop surface 40 at the other end 23 to cooperate with complementary features of adjacent segments and receive the drive members 30. The stop surfaces 40 and/or threaded bores 38 may be defined at least in part within ears or tabs 46 extending outwardly from the segments 22, providing drive surfaces engageable by the drive members 30. Hence, turning a drive member 30 in one direction will pull the associated segments 22 closer together and reduce the gap 26 between them, and turning the drive member 30 the opposite direction will push the segments 22 apart and enlarge the gap 26 between them.

Figure 2:
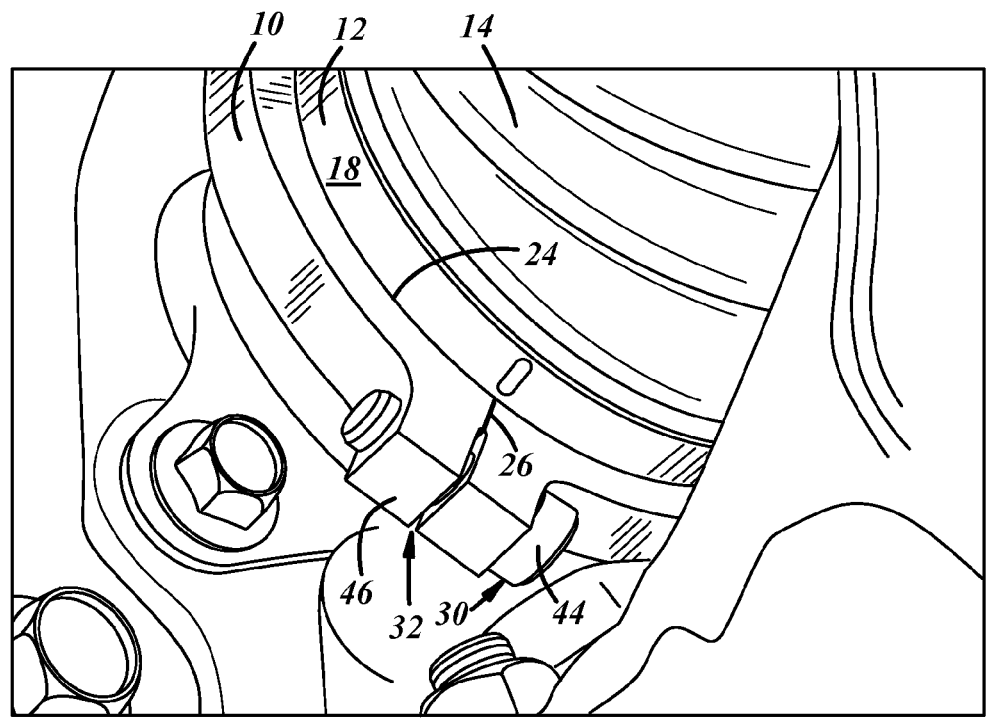
FIG. 2 is an enlarged, fragmentary perspective view showing the tool installed as in FIG. 1.
Figure 3:
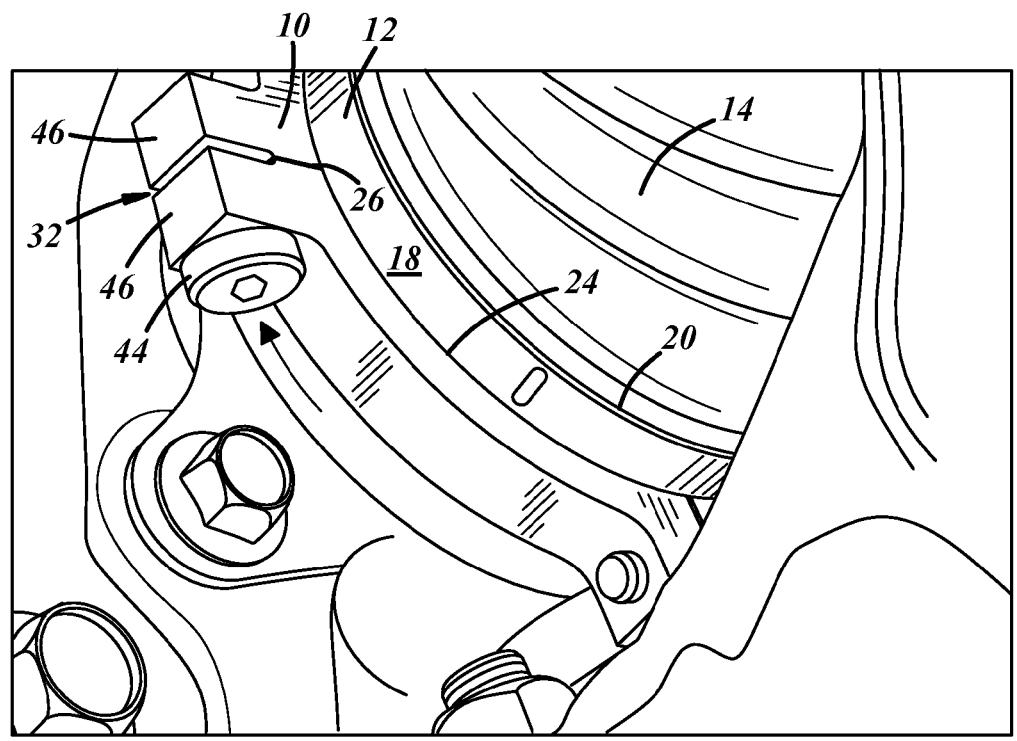
FIG. 3 is a view similar to FIG. 2 showing the tool rotated relative to the clamp.
Figure 4:
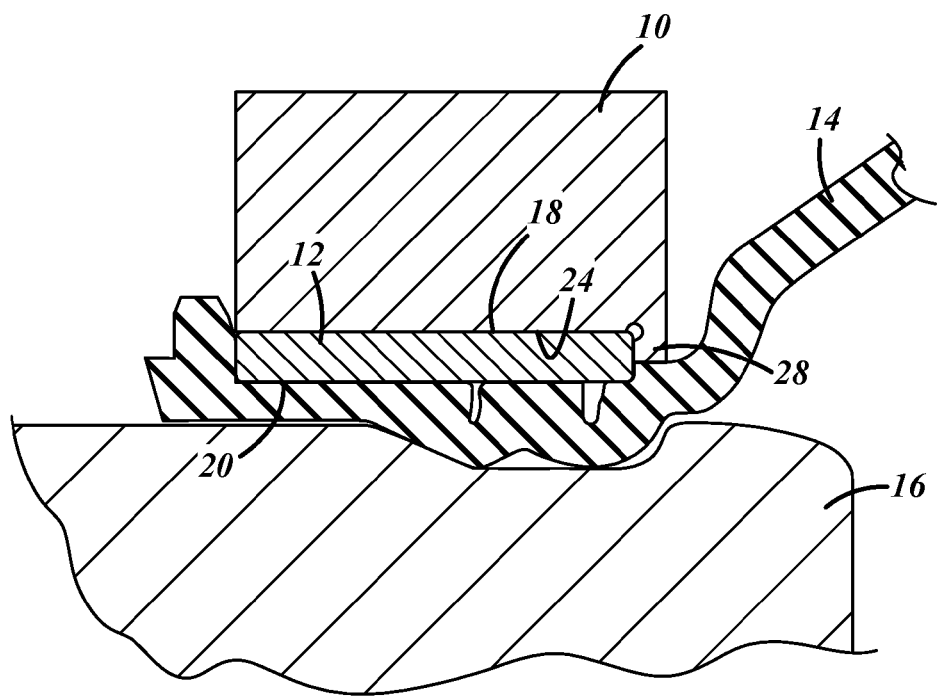
FIG. 4 is a fragmentary sectional view showing the tool, clamp, boot and associated portion of the constant velocity joint.
Figure 5:
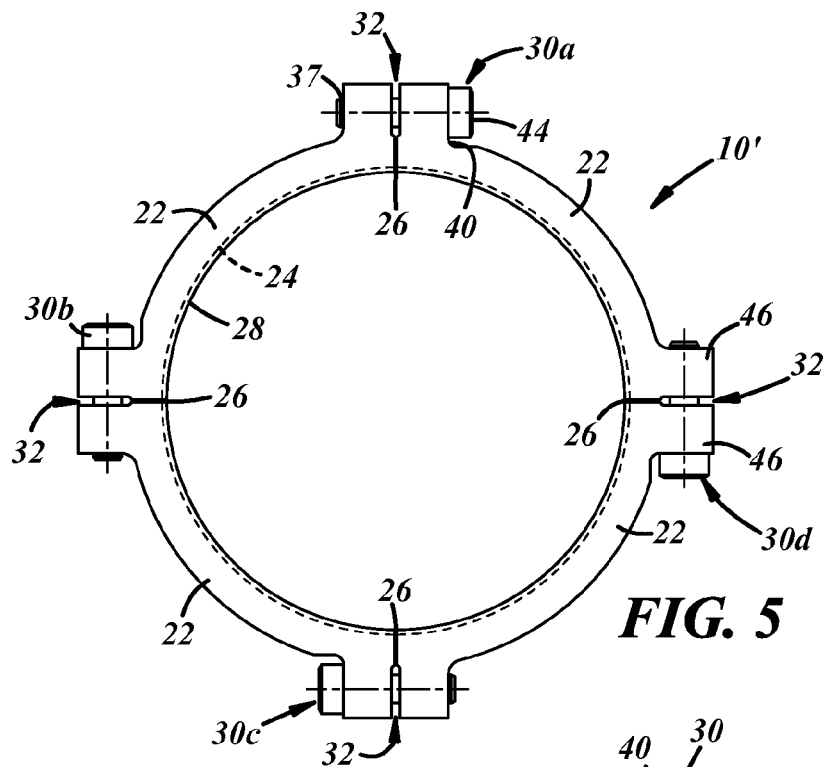
FIG. 5 is a front view of the tool.
Figure 6:
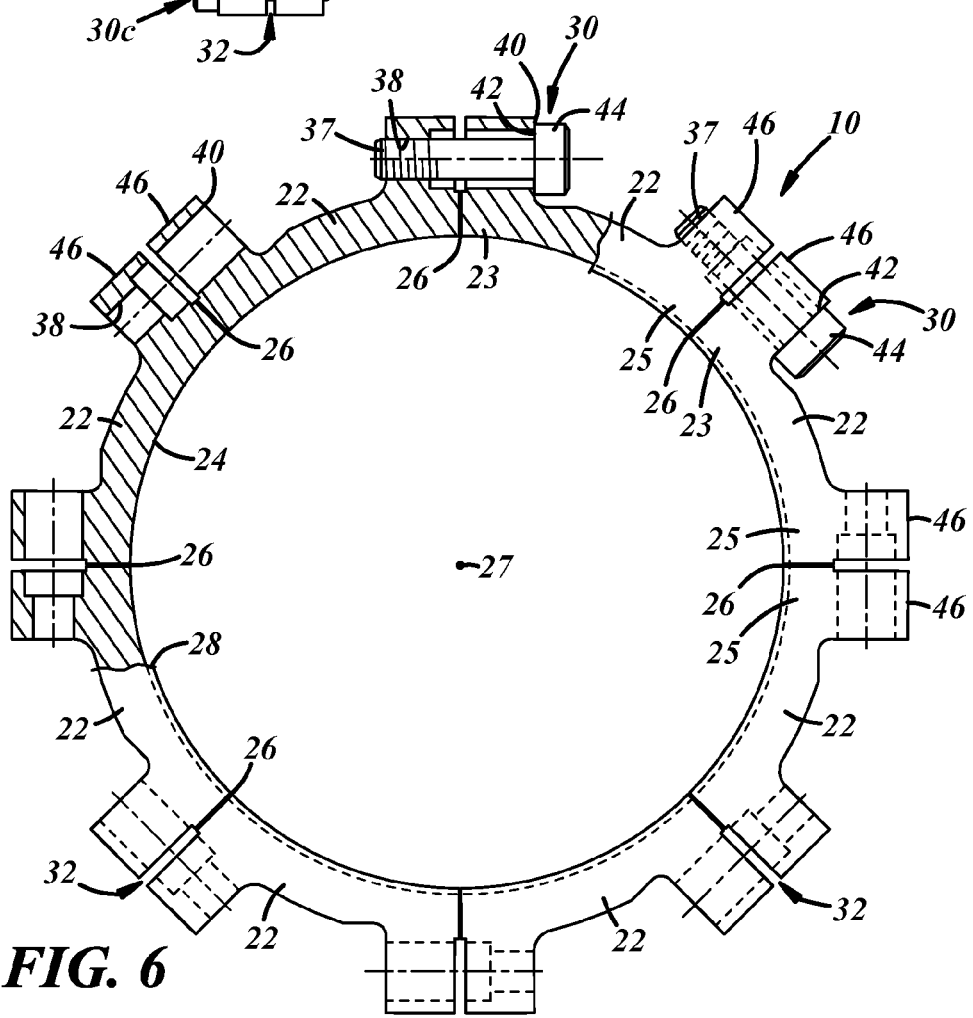
FIG. 6 is a partially sectioned front view of a tool.

To facilitate opening the tool 10 by separating the ends 23, 25 of at least two adjacent segments 22, at least one drive member 30 is releasably coupled to at least one segment 22. The drive member 30 may be removed from one segment 22 (e.g. by backing the threaded portion 37 completely out of its associated threaded bore 38) to permit the tool 10 to be opened at that junction 32. Permitting the tool 10 to be opened in this manner facilitates positioning the tool 10 around a clamp 12, even when the clamp 12 is already installed on a boot 14, and even when the boot 14 is already installed on the CVJ or shaft, and even when the CVJ or shaft is installed on a vehicle (as shown in FIGS. 1-3). In at least some implementations, more than one drive member 30 is releasable connected to at least one of its associated segments 22, to facilitate opening or separating different portions of the tool 10. For example, the tool 10 may be split in half, providing two generally semi-circular sections by removing two drive members 30. The two halves of the tool 10 may then be positioned over the clamp 12 and the two drive members 30 may be reconnected to the segments 22 they were removed from so that the tool 10 again surrounds the outer surface 18 of the clamp 10.

After the tool 10 is positioned around the clamp 12, the drive member or drive members 30 may be moved toward or to their second positions to compress or crimp the clamp 12. In the example of a tool 10 having more than four segments 22, the drive members 30 may alternately be moved toward their second positions in an order such that adjacent drive members (drive members next to each other in the circumferential direction) are not consecutively moved, at least during consecutive steps, as will be described more fully below. This may more evenly tighten the tool 10 and prevent uneven compression of the clamp 12 which might otherwise distort the shape of the clamp and/or damage or mar the underlying boot 14. In an example tool having four segments 22, as shown in FIGS. 1-5, a first drive member 30a may be moved at least part of the way from its first position toward its second position. Then, the opposite (diametrically opposite where the segments are of equal or generally equal size) drive member 30c may likewise be moved at least part of the way toward its second position. Next, an adjacent drive member 30b may be moved at least part of the way toward its second position and then the drive member 30d opposite to drive member 30b may be moved. The process may be repeated until all drive members 30a-d are moved to or at least a desired distance toward their second positions. In tools 10 having more than four segments, such as is shown in FIGS. 6-9, it is possible to tighten the tool 10 without consecutively moving circumferentially adjacent drive members 30.

The second or final position of the drive members 30 may be determined based on a size of the gap 26 between adjacent segments 22, based on a disappearance of the gap 26 (e.g. the segments in question touch each other), based on a force needed to further move the drive member 30 (e.g. a torque level), or on some other factor or factors. In one example, each drive member 30 is a threaded connector and movement of the drive members is stopped when the torque needed to further move the drive members is at a threshold, which may be about 40 Nm or any other desired value or range of values.

After the drive members 30 are moved as desired, the tool 10 may be rotated relative to the clamp 12 to further crimp the clamp, if desired, or the tool may be removed from the clamp. If further crimping is desired, the drive members 30 may be rotated back to or toward their first position to loosen the tool 10 and permit the tool to be rotated relative to the clamp 12. The tool 10 may be rotated any desired amount and in at least certain implementations, the tool is rotated so that the location of a gap 26 between adjacent segments 22 does not line-up with the location of a gap in the previous position of the tool 10. This may reduce the affect of any crease formed in the clamp 12 at a gap 26, due to the edges of the segments 22 that define the gap 26 digging into the clamp 12. Or this might just avoid further marring or damaging the clamp 12 by similar action in the new position of the tool 10. After the crimping process is complete (the tool 10 may be rotated any number of times and retightened), the clamp 12 is crimped on the boot 14 and the tool 10 may be removed from the clamp 12. To do this, one or more drive members 30 may be released from one or more clamp segments 22 so that adjacent segments 22 can be moved apart to open the tool 10 sufficiently to remove the tool 10 from the clamp 12.

In at least some implementations, a tool 10, 10', 34 may include N number of segments 22 where N is an integer greater than one, the segments 22 are sequentially connected together so that there are N junctions 32 in total and N gaps 26 (in at least certain positions of the drive members) with one gap 26 at each junction 32, and N drives 30 are provided, with each drive 30 coupled to two segments 22 and movable from a first position in which the gap 26 associated with said two segments 22 is larger and a second position in which the associated gap 26 is smaller. In other implementations, a tool 10, 10', 34 may include N number of segments 22, where N is an integer greater than one, the segments 22 are sequentially connected together so that there are N junctions 32 where a junction 32 includes a point of connection between adjacent segments 22, and there are Y gaps 26 provided in the clamp where Y is an integer less than N. Y number of drives 30 are provided with each drive 30 associated with a separate one of the gaps 26 and operable to control the size of an associated gap 26 to vary the inner diameter defined by the clamp. At least some implementations of tools may follow these relationships: N≥3 and Y=1.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A tool for compressing an annular clamp having a circular exterior surface and an axial face, comprising:
   multiple segments each having opposed axial faces and an inner surface adapted to engage the exterior surface of the clamp, at least two segments are movable relative to each other and a gap is provided between said two segments, and wherein the inner surface of each segment has an axial width between the two opposed axial faces of the segment, and one or more segments include a radially inwardly extending lip adjacent to one of the axial faces of said one or more segments and the lip is adapted to engage an axial face of the clamp; and
   a drive associated with said two segments to move said two segments and vary the size of the gap between said two segments, wherein said segments are interconnected so that the inner surfaces of the segments define an inner diameter of the tool and adapted to surround at least a majority of the exterior surface of the clamp and movement of said two segments by the drive varies the inner diameter defined by the segments.

2. The tool of claim 1 wherein the drive is movable from a first position in which the gap and inner diameter are larger and a second position in which the gap and inner diameter are smaller, and the tool is adapted to engage and compress the clamp when the drive is in the second position.

3. The tool of claim 2 wherein the drive includes a threaded portion and at least one of said two segments includes a threaded bore that receives the threaded portion.

4. The tool of claim 3 wherein rotation of the drive in one direction reduces the size of the gap and rotation of the drive in the opposite direction increases the size of the gap.

5. The tool of claim 3 wherein the threaded portion may be removed from the threaded bore to permit separation of ends of said two segments.

6. The tool of claim 3 wherein at least one of said two segments includes a stop surface engageable by the drive so that rotation of the drive while the threaded portion is received in the threaded bore and the stop surface is engaged by the drive changes the size of the gap.

7. The tool of claim 6 wherein the stop surface is defined in a tab that extends outwardly from said at least one of said two segments.

8. The tool of claim 1 wherein a gap is defined at the junction between each of the adjacent segments and a separate drive is provided for each junction to vary the size of the associated gap.

9. The tool of claim 8 wherein there are N number of segments where N is an integer greater than one, the segments are connected together so that there are N junctions in total and N gaps with one gap at each junction, and wherein N drives are provided with each drive coupled to two segments and movable from a first position in which the gap associated with said two segments is larger and a second position in which the associated gap is smaller.

10. The tool of claim 1 wherein there are N number of segments where N is an integer greater than one, the segments are connected together so that there are N junctions where a junction includes a point of connection between adjacent segments, and there are Y gaps provided in the tool where Y is an integer less than N, and wherein Y drives are provided with each drive associated with a separate one of the gaps and operable to control the size of an associated gap.

11. The tool of claim 10 wherein N≥3 and Y=1.

12. The tool of claim 10 wherein each segment is pivotably connected to at least one other segment to define a chain and one or more chains define said inner diameter.

13. The tool of claim 1 wherein each segment includes a radially inwardly extending lip adjacent to one of the axial faces adapted to engage an axial face of the clamp.

14. The tool of claim 1 wherein both of said at least two segments that are movable relative to each other include an outwardly extending tab, the tab of one of said at least two segments having a stop surface engageable by the drive and the tab of the other of said at least two segments having a bore in which the drive member is received so that the drive member engages the tab of both of said at least two segments and the drive member is movable relative to the tabs to vary the size of the gap between said at least two segments.

15. A tool for compressing or crimping a clamp for a boot of a constant velocity joint that has a circular outer surface, comprising:

four or more segments each having two opposed axial faces and an inner surface adapted to engage the outer surface of the clamp and wherein the inner surface of each segment has an axial width between the two opposed axial faces of the segment, and each segment includes a lip extending inwardly beyond the inner surface the segment and located adjacent to one of the axial faces of said segment, each segment having two ends with each end adapted to be connected to and movable relative to at least one adjacent segment with a junction defined at each end of each segment and an adjustable gap provided at at least one junction; and a separate drive associated with each gap, each drive being movable to move the ends of the segments associated with that drive and thereby vary the size of the gap at the associated junction, wherein the segments are interconnected so that the inner surfaces of the segments define an inner diameter of the tool and adapted to surround at least a majority of the exterior surface of the clamp and movement of the drives varies an inner diameter defined by the inner surfaces of the segments.

16. The tool of claim 15 wherein each drive is movable from a first position in which the associated gap and inner diameter of the clamp are larger and a second position in which the associated gap and inner diameter of the clamp are smaller.

17. The tool of claim 15 wherein there are N number of tool segments where N is an integer greater than one, the tool segments are connected together so that there are a total of N junctions and a total of N gaps with one gap at each junction, and wherein N drives are provided with each drive coupled to two tool segments and movable from a first position in which the gap associated with said two tool segments is larger and an second position in which the associated gap is smaller.

18. The tool of claim 15 wherein there are N number of tool segments where N is an integer greater than one, the tool segments are connected together so that there are N junctions where a junction includes a point of connection between adjacent tool segments, and there are Y gaps provided in the tool where Y is an integer less than N, and wherein Y drives are provided with each drive associated with a separate one of the gaps and operable to control the size of an associated gap.

19. The tool of claim 18 wherein N≥3 and Y=1.

20. The tool of claim 15 wherein each segment includes a first outwardly extending tab adjacent to a first one of the two ends, and each segment includes a second outwardly extending tab adjacent to a second one of the two ends, wherein the first tab includes a stop surface and the second tab includes a threaded bore, and wherein the drive includes a stop surface and a threaded portion, and wherein the stop surface of one drive member is engaged with the stop surface of the first tab of one of two adjacent segments and the threaded portion of said one drive member is received in the threaded bore of the second tab of the other of the two adjacent segments so that rotation of the drive member relative to the two adjacent segments changes the size of the gap between the two adjacent segments.

* * * * *